(12) United States Patent
Tzannes et al.

(10) Patent No.: US 8,045,603 B2
(45) Date of Patent: *Oct. 25, 2011

(54) METHOD AND A MULTI-CARRIER TRANSCEIVER SUPPORTING DYNAMIC SWITCHING BETWEEN ACTIVE APPLICATION SETS

(75) Inventors: Marcos C. Tzannes, Orinda, CA (US); Michael A. Tzannes, Lexington, MA (US); David C. Hunter, Winchester, MA (US); Richard W. Gross, Acton, MA (US); Halil Padir, North Andover, MA (US)

(73) Assignee: Daphimo Co. B.V., LLC, Wilmington, DE (US)

( * ) Notice: Subject to any disclaimer, the term of this patent is extended or adjusted under 35 U.S.C. 154(b) by 0 days.
This patent is subject to a terminal disclaimer.

(21) Appl. No.: 12/859,086

(22) Filed: Aug. 18, 2010

(65) Prior Publication Data
US 2010/0309967 A1 Dec. 9, 2010

Related U.S. Application Data

(63) Continuation of application No. 12/013,043, filed on Jan. 11, 2008, now Pat. No. 7,813,418, which is a
(Continued)

(51) Int. Cl.
*H04L 5/16* (2006.01)
(52) U.S. Cl. ........................... 375/222; 370/464
(58) Field of Classification Search .................. 375/222, 375/220, 260; 370/464, 468, 265, 437
See application file for complete search history.

(56) References Cited

U.S. PATENT DOCUMENTS
3,573,380 A 4/1971 Darlington
(Continued)

FOREIGN PATENT DOCUMENTS
EP 0473465 B1 3/1992
(Continued)

OTHER PUBLICATIONS
SA, Atungsiri et al., "Multirate Coding for Mobile Communications Link Adaptation" IEEE Proc-Com vol. 144, No. 3, Jun. 1997; pp. 211-216.
(Continued)

*Primary Examiner* — Kevin Kim
(74) *Attorney, Agent, or Firm* — Schwabe, Williamson & Wyatt, P.C.

(57) ABSTRACT

A transceiver and method for communicating over a communications channel having a plurality of subchannels are described. In particular, the transceiver is capable of dynamically switching between communicating data for a first active application set and communicating data for a second different active application set. An active application set is defined as the set of one or more active applications for which the transceiver is currently communicating data. As part of communicating data for the first active application set, the transceiver allocates the subchannels to the one or more applications in the first application set. The transmission requirements of the first active application set defines a first communication state of the transceiver. When the transceiver dynamically transitions to communicating data for the second different application set, the transceiver reallocates the subchannels to the one or more applications in the second different application set. The transmission requirements of the second different active application set defines a second communication state of the transceiver. In one embodiment the transceiver modifies the data rates of subchannels in the Bit Allocation Table according to the transmission requirements of the application whose data is being transmitted on the particular subchannel. In another embodiment, the transceiver is capable of dynamically switching from transmitting data for an Internet access application to transmitting data for a voice telephony application in addition to the Internet access application. In a further embodiment, the ABCD voice telephony signaling bits can be transmitted with either the data from the Internet access application or the data from the voice telephony application.

21 Claims, 3 Drawing Sheets

Related U.S. Application Data continuation of application No. 10/863,246, filed on Jun. 9, 2004, now abandoned, which is a continuation of application No. 09/663,001, filed on Sep. 15, 2000, now Pat. No. 6,775,320, which is a continuation-in-part of application No. 09/522,869, filed on Mar. 10, 2000, now Pat. No. 6,498,808.

(60) Provisional application No. 60/177,081, filed on Jan. 19, 2000, provisional application No. 60/161,115, filed on Oct. 22, 1999, provisional application No. 60/154,116, filed on Sep. 15, 1999, provisional application No. 60/124,222, filed on Mar. 12, 1999.

(56) References Cited

U.S. PATENT DOCUMENTS

| | | |
|---|---|---|
| 4,131,766 A | 12/1978 | Narasimha |
| 4,568,156 A | 2/1986 | Dane |
| 4,679,227 A | 7/1987 | Hughes-Hartogs |
| 4,731,816 A | 3/1988 | Hughes-Hartogs |
| 4,802,190 A | 1/1989 | Schouhamer Immink |
| 4,912,763 A | 3/1990 | Galand et al. |
| 5,048,054 A | 9/1991 | Eyuboglu et al. |
| 5,128,964 A | 7/1992 | Mallory |
| 5,206,886 A | 4/1993 | Bingham |
| 5,226,081 A | 7/1993 | Hinokimoto |
| 5,285,474 A | 2/1994 | Chow et al. |
| 5,327,574 A | 7/1994 | Monma et al. |
| 5,400,322 A | 3/1995 | Hunt et al. |
| 5,428,790 A | 6/1995 | Harper et al. |
| 5,452,288 A | 9/1995 | Rahuel et al. |
| 5,479,447 A | 12/1995 | Chow et al. |
| 5,497,398 A | 3/1996 | Tzannes et al. |
| 5,521,906 A | 5/1996 | Grube et al. |
| 5,533,008 A | 7/1996 | Grube et al. |
| 5,555,244 A | 9/1996 | Gupta et al. |
| 5,596,604 A | 1/1997 | Cioffi et al. |
| 5,598,435 A | 1/1997 | Williams |
| 5,625,651 A | 4/1997 | Cioffi |
| 5,636,246 A | 6/1997 | Tzannes et al. |
| 5,644,573 A | 7/1997 | Bingham et al. |
| 5,667,991 A | 9/1997 | Koller et al. |
| 5,682,419 A | 10/1997 | Grube et al. |
| 5,708,659 A | 1/1998 | Rostoker et al. |
| 5,774,671 A | 6/1998 | Satoh |
| 5,812,599 A | 9/1998 | Van Kerckhove |
| 5,822,372 A | 10/1998 | Emami |
| 5,822,374 A | 10/1998 | Levin |
| 5,910,959 A | 6/1999 | Olafsson et al. |
| 6,009,122 A | 12/1999 | Chow |
| 6,011,814 A | 1/2000 | Martinez et al. |
| 6,052,411 A | 4/2000 | Mueller et al. |
| 6,072,779 A | 6/2000 | Tzannes et al. |
| 6,084,917 A | 7/2000 | Kao et al. |
| 6,091,713 A | 7/2000 | Lechleider et al. |
| 6,188,729 B1 | 2/2001 | Perkins |
| 6,266,348 B1 | 7/2001 | Gross et al. |
| 6,272,170 B1 | 8/2001 | Chu |
| 6,426,961 B1 | 7/2002 | Nimmagadda |
| 6,449,288 B1 | 9/2002 | Chari et al. |
| 6,480,475 B1 | 11/2002 | Modlin et al. |
| 6,498,808 B1 | 12/2002 | Tzannes |
| 6,567,473 B1 | 5/2003 | Tzannes |
| 6,665,872 B1 | 12/2003 | Krishnamurthy et al. |
| 6,667,991 B1 | 12/2003 | Tzannes |
| 6,775,320 B1 | 8/2004 | Tzannes |
| 6,778,596 B1 | 8/2004 | Tzannes |
| 7,649,928 B2 | 1/2010 | Tzannes |
| 7,860,175 B2 | 12/2010 | Tzannes |
| 2002/0015421 A1 | 2/2002 | Abbas et al. |
| 2002/0080824 A1 | 6/2002 | Wingrove |
| 2004/0223510 A1 | 11/2004 | Tzannes |
| 2004/0223511 A1 | 11/2004 | Tzannes |
| 2005/0220202 A1 | 10/2005 | Tzannes |
| 2007/0019755 A1 | 1/2007 | Tzannes |
| 2007/0133704 A1 | 6/2007 | Tzannes |

FOREIGN PATENT DOCUMENTS

| | | |
|---|---|---|
| EP | 0652677 A2 | 5/1995 |
| EP | 0703685 A2 | 3/1996 |
| EP | 0753947 A1 | 1/1997 |
| EP | 0753948 A1 | 1/1997 |
| EP | 0762701 A2 | 3/1997 |
| EP | 0812087 A2 | 12/1997 |
| EP | 0820168 A2 | 1/1998 |
| EP | 0828363 A2 | 3/1998 |
| EP | 0833474 A2 | 4/1998 |
| EP | 0840474 A2 | 5/1998 |
| EP | 0869647 A2 | 10/1998 |
| EP | 0905948 A2 | 3/1999 |
| EP | 0916196 A1 | 5/2000 |
| JP | 04022235 A | 1/1992 |
| JP | H040222355 | 1/1992 |
| JP | 531611 A | 11/1993 |
| JP | 5327796 A | 12/1993 |
| JP | 7183862 A | 7/1995 |
| JP | H07183862 | 7/1995 |
| JP | 9294140 | 11/1997 |
| JP | H10154949 | 6/1998 |
| JP | H10247897 | 9/1998 |
| JP | 11127218 A | 5/1999 |
| JP | 2000224136 | 8/2000 |
| JP | 2000558624 A | 7/2002 |
| JP | 2002520902 B1 | 7/2002 |
| WO | 8607223 A1 | 12/1986 |
| WO | 9715131 A2 | 4/1997 |
| WO | 9736384 A1 | 10/1997 |
| WO | 9810556 A2 | 3/1998 |
| WO | 9827665 A1 | 6/1998 |
| WO | 9857472 A1 | 12/1998 |
| WO | 9859476 A1 | 12/1998 |
| WO | 9916224 A1 | 4/1999 |
| WO | 9918701 A1 | 4/1999 |
| WO | 9920027 A2 | 4/1999 |
| WO | 0002335 A2 | 1/2000 |
| WO | 0013387 A1 | 3/2000 |
| WO | 0113622 A2 | 2/2001 |

OTHER PUBLICATIONS

International Search Report and Written Opinion, mailed Dec. 29, 2000, for PCT Application No. PCT/US00/25387.
International Preliminary Examination Report, mailed Jan. 21, 2002, for PCT Application No. PCT/US00/25387.
Examiner's First Report, mailed Aug. 12, 2003, for AU Application No. 2000075846.
Office Action, mailed Oct. 11, 2007, for CA Application No. 2382522.
Office Action, mailed Dec. 1, 2005, for EP Application No. 00965061.5.
Office Action, mailed Jul. 11, 2007, for U.S. Appl. No. 10/863,246.
Office Action, mailed Nov. 9, 2009 for U.S. Appl. No. 11/771,261, 20 pages.
Office Action, mailed Oct. 26, 2009, for JP Application No. 2007-234604, 4 pages.
Office Action, mailed Nov. 2, 2009, for JP Application No. 2007-060099, 6 pages.
Office Action, mailed Oct. 26, 2009, for JP Application No. 2000-604585, 7 pages.
Office Action, mailed Nov. 18, 2009, for U.S. Appl. No. 12/013,043, 7 pages.
Office Action, mailed Oct. 26, 2009, for JP Application No. 2001-524318, 9 pages.
Office Action, mailed Oct. 26, 2009, for JP Application No. 2007-212849, 7 pages.
Office Action, mailed Jun. 10, 2009, for EP Application 8012733.5, 6 pages.
"A series of new chipset models—Transmission scheme is bipolarized in CAP and DMT" Nikkei Electronics, Japan, Nov. 18, 1996, pp. 104-108.

"Dual PLL Synthesizer for PHS Cell Station", Yoshihisa Suzuki, Kenji Shibata and Junichi Kimurra, National Technical Report, Japan, Matsushita Electric Industrial Co., Ltd., Aug. 1996, vol. 42, No. 4, pp. 9-13.
Office Action, mailed Dec. 2, 2009, U.S. Appl. No. 12/044,498, 6 pages.
Office Action, mailed Jan. 25, 2010, for JP Application 2001-524319, 4 pages.
Office Action, mailed Jan. 17, 2003, for U.S. Appl. No. 09/523,086.
Office Action for KR Patent Application 10-2002-7003424 mailed May 7, 2009, 4 pages.
Final Office Action for U.S. Appl. No. 11/771,261, mailed May 18, 2010, 11 pages.
Notice of Allowability mailed for U.S. Appl. No. 11/771,261, mailed Aug. 11, 2010, 3 pages.
Office Action for U.S. Appl. No. 12/013,043, mailed Oct. 23, 2008, 4 pages.
Office Action for U.S. Appl. No. 12/013,043, mailed Nov. 18, 2009, 7 pages.
Office Action for U.S. Appl. No. 12/636,416, mailed Jun. 30, 2010, 20 pages.
Final Office Action for U.S. Appl. No. 12/636,416, mailed Nov. 5, 2010, 24 pages.
Office Action for CA Patent Application 2369110, mailed Mar. 11, 2008, 3 pages.
Office Action for EP Patent Application 965061.5, mailed Jan. 22, 2007, 3 pages.
Office Action for JP Patent Application 2001-524318, mailed Jun. 15, 2010, 5 pages.
Office Action for JP Patent Application 2007-060099, mailed Sep. 14, 2010, 5 pages.
Office Action for JP Patent Application 2010-012605, mailed Sep. 14, 2010, 5 pages.
Notice of Allowance for JP Patent Application 2000-604585, mailed Sep. 14, 2010, 6 pages.
"Waves of new chip set products coming, each employs one of the two transmission format: CAP and DMT", Nikkei Electronics, Japan, Nikkei BP Co., Ltd., Nov. 18, 1996, vol. Nov. 18, 1996, pp. 104-108.
Final Office Action, mailed May 15, 2003, for U.S. Appl. No. 09/523,086.
Notice of Allowability, mailed Sep. 9, 2003, for U.S. Appl. No. 09/523,086.
Office Action, mailed May 23, 2002, for U.S. Appl. No. 09/522,869.
Notice of Allowability, mailed Aug. 9, 2002, for U.S. Appl. No. 09/522,869.
Office Action, mailed Jul. 31, 2002, for U.S. Appl. No. 09/522,870.
Notice of Allowability, mailed Jan. 15, 2003, for U.S. Appl. No. 09/522,870.
International Search Report, mailed Jul. 7, 2000, for PCT/US00/006392.
Office Action, mailed Jun. 27, 2006, for U.S. Appl. No. 11/409,336.
International Search Report, mailed Dec. 29, 2000, for PCT/US00/025352.
Office Action, mailed Jan. 16, 2003, for U.S. Appl. No. 10/145,054.
Office Action, mailed Jun. 20, 2003, for U.S. Appl. No. 10/145,054.
Office Action, mailed Jan. 29, 2004, for U.S. Appl. No. 10/145,054.
Office Action, mailed Jun. 18, 2004, for U.S. Appl. No. 10/145,054.
Office Action, mailed Jul. 14, 2004, for U.S. Appl. No. 10/653,271.
Office Action, mailed Nov. 24, 2006, for U.S. Appl. No. 10/663,801.
Office Action, mailed Jan. 23, 2006, for U.S. Appl. No. 11/246,162.
Office Action, mailed Mar. 7, 2005, for U.S. Appl. No. 10/962,589.
Office Action, mailed Jul. 12, 2005, for U.S. Appl. No. 11/144,645.
Office Action, mailed Apr. 4, 2007, for U.S. Appl. No. 11/675,369.
Office Action, mailed Nov. 15, 2006, for U.S. Appl. No. 11/534,843.
Office Action, mailed Sep. 7, 2007, for U.S. Appl. No. 10/863,247.
Office Action, mailed Nov. 22, 2006, for KR Application 10-2002-7003424.
Office Action, mailed Sep. 10, 2007, for CA Application 2382519.
Office Action, mailed Nov. 18, 2008, for U.S. Appl. No. 12/044,498.
Final Office Action, mailed Jul. 21, 2009, for U.S. Appl. No. 12/044,498.
Office Action, mailed Oct. 30, 2007, for U.S. Appl. No. 11/678,388.
Final Office Action, mailed Aug. 22, 2008, for U.S. Appl. No. 11/678,388.
Office Action, mailed Mar. 11, 2009, for U.S. Appl. No. 11/678,388.
Office Action, mailed Jan. 8, 2008, for U.S. Appl. No. 11/771,261.
Office Action, mailed Nov. 17, 2008, for Application 11/771,261.
Search Report, mailed Sep. 9, 2008, for EP Application 8012733.5.
Search Report, mailed Jul. 10, 2006, for EP Application 6007976.1.
Search Report, mailed Jul. 4, 2008, for EP Application 8009620.9.
Search Report, mailed Mar. 30, 1999, for EP Application 08019583.7.
Search Report, mailed Dec. 29, 2000, for EP Application 965061.5.
Office Action, mailed Feb. 13, 2003, for AU Application 200038762.
Office Action, mailed Aug. 12, 2003, for AU Application 200075846.
Office Action, mailed Aug. 11, 2003, for AU Application 200075835.
Office Action, mailed Feb. 27, 2004, for AU Application 2003204966.
Office Action, mailed Aug. 11, 2006, for AU Application 2005200136.
Office Action, mailed Jun. 4, 2003, for U.S. Appl. No. 10/351,402.
"Efficient Bit Allocation for an Arbitrary Set of Quantizers" IEEE Transactions on Acoustics, Speech and Signal Procesing, vol. 36, No. 9, Sep. 1988, pp. 1445-1453.
"ITU-T-Recommendation G.992.1" International Telecommunication Union, Jun. 1999, 256 pages.
"ITU-T-Recommendation G.992.2" International Telecommunication Union, Jun. 1999, 179 Pages.
"Seamless data-rate change using punctured convolutional codes for time-varying signal-to-noise ratio", ICC 95 Seattle, Gateway to Globaliztion, 1995 IEEE International Conference on Communication, 1995, vol. 1, Jun. 18-22, 1995 pp. 342-346.
"DMT-based ADSL: Concept, Architecture, and performance" IEEE Oct. 19, 1994, pp. 3/1-3/5, XP006503444.
"Simulation and Experimental Studies on the Concept of a Rate-Adaptive Digital Subscriber Loop (RA-DSL)" IEEE Journal on Selected Areas in Communication, IEEE Service Center, Piscataway, NJ, US, vol. 9, No. 6, Aug. 1991, pp. 941-950, XP001188185, USSN: 0733-8716.
John A.C. Bingham, "Multicarrier Modulation for Data Transmission: An Idea Whose Time has Come" IEEE Communications Magazine; May 1990 pp. 5-14.
John A.C. Bingham, "RFI Suppression in Multicarrier Transmission System" Amati Communications, IEEE Communication Magazine; May 1996; pp. 1026-1030.
John M. Cioffi, "A Multicarrier Primer" Amati Communications Corporation and Stanford University pp. 1-18, Nov. 1999.
Office Action for U.S. Appl. No. 12/636,416, mailed Feb. 8, 2011, 8 pages.
Office Action for U.S. Appl. No. 12/949,633, mailed Mar. 14, 2011, 11 pages.
Final Office Action for JP Application 2007-060099, mailed Feb. 15, 2011, 3 pages.
Notice of Allowance, issued in U.S. Appl. No. 12/636,416, mailed Jul. 14, 2011, 8 pages.
Cioffi, J. M., "The Essential Merit of Bit-Swapping," ATIS Contribution T1E1, 1998, 4 pages.

METHOD AND A MULTI-CARRIER TRANSCEIVER SUPPORTING DYNAMIC SWITCHING BETWEEN ACTIVE APPLICATION SETS

RELATED APPLICATIONS

This application is a continuation of copending U.S. application Ser. No. 12/013,043, filed Jan. 11, 2008, which is a continuation of U.S. application Ser. No. 10/863,246, filed Jun. 9, 2004, which is a continuation of U.S. application Ser. No. 09/663,001, filed Sep. 15, 2000 and now patented as U.S. Pat. No. 6,775,320, which is a continuation-in-part of U.S. patent application Ser. No. 09/522,869, filed on Mar. 10, 2000, now patented as U.S. Pat. No. 6,498,808, which claims the benefit of and priority to U.S. provisional application Ser. No. 60/124,222, filed Mar. 12, 1999, entitled "Seamless Rate Adaptive (SRA) ADSL System", U.S. provisional application Ser. No. 60/161,115, filed Oct. 22, 1999, entitled "Multicarrier System with Stored Application Profiles", U.S. provisional application Ser. No. 60/177,081, filed Jan. 19, 2000, entitled "Seamless Rate Adaptive (SRA) Multicarrier Modulation System and Protocols, and U.S. provisional application Ser. No. 60/154,116, filed Sep. 15, 1999, entitled "Transceiver Supporting Multiple Applications", which specifications are incorporated herein by reference in their entirety.

FIELD OF THE INVENTION

This invention relates to transmission systems using multicarrier modulation. More particularly, the invention relates to multicarrier transmission systems that support multiple applications.

BACKGROUND OF THE INVENTION

Digital Subscriber Line (DSL) technology provides high-speed transport of digital information over twisted pair phone lines. The typical DSL system uses a multicarrier modulation format that employs Fourier Transform as the modulation/demodulation engine. This transmission scheme is denoted as Discrete Multitone Modulation (DMT). The DSL system divides the transmission spectrum into multiple frequency bands called subchannels. Each subchannel can be modulated with a sinusoidal carrier to transmit information. A transmitter modulates an output data stream containing information bits onto one or more subchannels. A receiver demodulates all the subchannels in order to recover the transmitted information bits as an input data stream. For simplicity of reference, the term transceiver refers collectively to transmitters and receivers.

DSL systems can be used in an asymmetrical configuration (ADSL) where the data rate in a given direction, upstream from the residence to the central office and downstream from the central office to the residence, is different. DSL Systems can also be used in a symmetrical configuration where the data rate is equal in both directions.

The quality of transmission, in terms of Bit Error Rate (BER), can also be varied for different subchannels within the composite data stream. In addition to the high-speed digital transport over the twisted pair telephony wire, analog telephony, plain old telephone service (POTS), is also supported. The POTS signal occupies the low frequency region from 0-4 kHz and the digital data occupies the higher frequency band from approximately 30 kHz to many hundreds of kilohertz or several megahertz depending on the application.

ADSL enables a variety of applications, such as Internet access, digitized voice calls, video-on-demand, broadcast video, and video conferencing. Typically transceivers are designed and optimized for a single application because each application has different requirements for at least a) data rate, b) bit error rate, c) latency, d) symmetry/asymmetry of transmission and e) immunity to impulse noise and other transient phenomena. As a result, a transceiver that is optimized for one application, such as video-on-demand, does not work as well if used for a different application, such as Internet access.

Classic transceiver architecture includes a Framer/Coder/Interleaver (FCI) block, a digital modulation block, an Analog Front End (AFE) block, and a communications channel. In most cases, it is the FCI block that is optimized for a specific application because the FCI block has significant control over three of the four parameters mentioned above: bit error rate, latency and immunity to impulse noise. Many transceivers use forward error correcting (FEC) codes, block and/or convolutional codes, to improve the bit error rate (BER) performance. Combining large block FEC codes with interleavers provides immunity to impulse noise. The disadvantage of large block FEC codes and interleaving is that they add latency to the system. As an example, if low BER and immunity to impulse noise are required for a specified application, the transceiver may include FEC codes and interleaving. If for another application low latency is important but a higher BER and/or burst errors resulting from impulse noise are tolerable, convolutional codes and no interleaving may be used.

The Digital Modulation block, the AFE block and the transmission channel establish the data rate of the transceiver for a specified BER and margin. Advancements in signal processing techniques and silicon processes in the digital modulation block and AFE technology have led to significant improvements in the data rates achievable on twisted pair phone lines. The result of this dramatic increase in transmission bandwidth is the ability to transport multiple applications over a single transceiver connection. Given the different performance requirements of different applications, there is a need for a transceiver designed to transmit and receive for multiple applications. Furthermore, there is a need for a transceiver designed to dynamically switch from transmitting and receiving data for a first set of applications to transmitting and receiving data for a second different set of applications.

SUMMARY OF THE INVENTION

One objective is to provide a DMT transceiver that can support multiple applications and that can dynamically change the transmission and reception of data as a set of active applications changes. In one aspect of the invention a multicarrier system has a communication channel and features a method for supporting at least two applications.

Each application in a set of currently active applications is associated with a different Framer/Coder/Interleaver block for processing bits associated with that application. One application in the set of currently active applications is allocated a subchannel for carrying bits processed by the Frame/Coder/Interleaver block that is associated with that application. In response to a change in the set of currently active applications, the subchannel is allocated to a second different application for carrying bits processed by the Framer/Coder/Interleaver block that is associated with that second application.

In one embodiment, the number of bits carried on the subchannel allocated to the second application is changed with respect to the number of bits that were carried on the subchannel for the first application. In another embodiment, the subchannel that is allocated to the second application has a first subset of the bits allocated to the second application and a second subset of the bits allocated to at least one other application. In yet another embodiment the first application is an asynchronous transfer mode data application and the second application is a voice telephony application.

In still another embodiment, the step of allocating the one subchannel to the second application includes selecting each subchannel by ordering the subchannels based on the frequency of the subchannels and iterating through the subchannels from the lowest frequency subchannel to the highest frequency subchannel. In another embodiment, the step of allocating the one subchannel to the second application includes selecting each subchannel by ordering the subchannels based on the frequency of the subchannels and iterating through the subchannels from the highest frequency subchannel to the lowest frequency subchannel. In another embodiment, the step of allocating the one subchannel to the second application includes selecting each subchannel by ordering the subchannels based on the number of bits carried by the subchannels and iterating through the subchannels from the subchannel carrying the lowest number of bits to the subchannel carrying the highest number of bits. In yet another embodiment, the step of allocating the one subchannel to the second application includes selecting each subchannel by ordering the subchannels based on the number of bits carried by the subchannels and iterating through the subchannels from the subchannel carrying the highest number of bits to the subchannel carrying the lowest number of bits.

In still another embodiment, one of the applications in the second active application set is a voice telephony application having a plurality of bits including a set of ABCD signaling bits, and the ABCD signaling bits are processed by a different Framer/Coder/Interleaver block than the other bits of the voice telephony application. In yet another embodiment one of the applications in the second application set is a voice telephony application having a plurality of bits including a set of ABCD signaling bits where the ABCD signaling bits are processed by the same Framer/Coder/Interleaver block as the other bits of the voice telephony application.

In still another embodiment at least one of the applications in the first active application set is also in the second different active application set. In another embodiment at least one of the subchannels is allocated to at least two applications.

In another aspect of the invention, a multicarrier system has a communication channel and features a method for supporting at least two applications. Each application in a set of currently active applications is associated with a different Framer/Coder/Interleaver block for processing bits associated with that application. At least one subchannel is allocated to each application in the set of currently active applications for carrying bits processed by the Framer/Coder/Interleaver block associated with that application. In response to a change in the set of currently active applications, a previously unallocated subchannel is allocated to one application in the changed set of currently active applications for carrying bits processed by the Framer/Coder/Interleaver block associated with that one application in the changed currently active application set.

In another aspect of the invention, a multicarrier system has a communication channel and features a method for supporting at least two applications. The system processes bits associated with the one or more applications in a first active application set using a different Framer/Coder/Interleaver block for each application in the first active application set. The system allocates subchannels to one or more applications in the first active application set for carrying bits associated with the one or more applications in the first active application set. The system transitions and processes bits associated with one or more applications in a second different active application set over a different latency path for each application in the second different active application set. The system changes the allocation of subchannels to one or more applications in the second different active application set for carrying bits associated with the one or more applications in the second active application set.

In one embodiment of the invention, when the system changes the allocation of subchannels it changes the number of bits carried on at least one subchannel. In another embodiment of the invention, when the system changes the allocation of subchannels it reallocates at least one subchannel from one application to a second different application. In yet another embodiment, when the system changes the allocation of subchannels it allocates at least one of the subchannels to at least two of the applications in the second different application set.

In another embodiment, the first active application set includes an asynchronous transfer mode data application and the second different active application set includes the asynchronous transfer mode data application and a voice telephony application. In still yet another embodiment the first active application set includes an asynchronous transfer mode data application, and a voice telephony application and the second different active application set includes the asynchronous transfer mode data application and excludes the voice telephony application.

In another embodiment when the system changes the allocation of subchannels, it at least allocates to the second different active application set a subchannel that was previously unused by one of the one or more applications in the first active application set. In yet another embodiment when the system changes the allocation of subchannels, at least one subchannel that was used by the applications in the first active application set is unused by the applications in the second different active application set.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1:
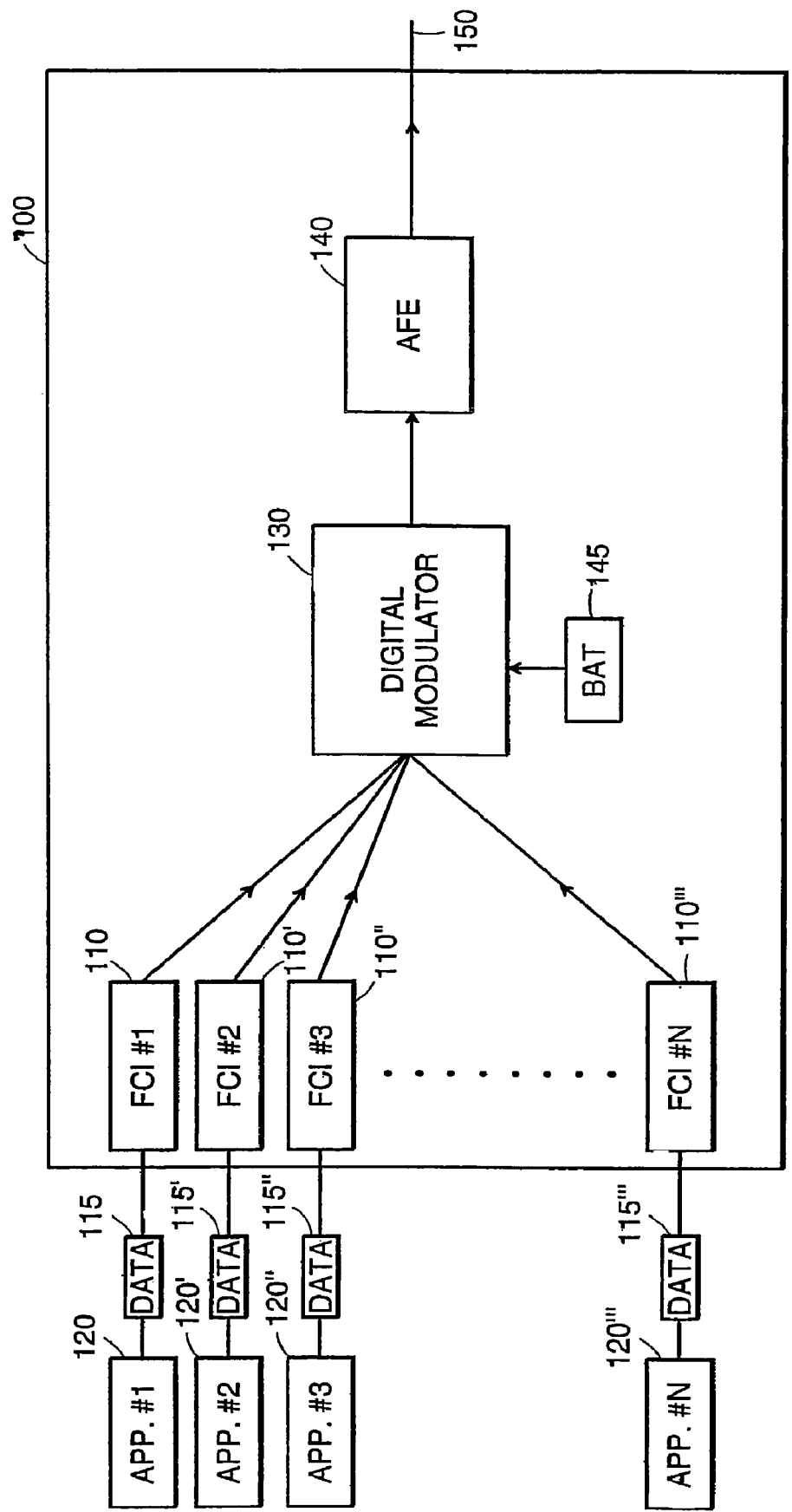
FIG. 1 is a block diagram of an embodiment of a transceiver having multiple Framer/Coder/Interleaver blocks and a Digital Modulation block.

FIG. 1 shows a block diagram for an exemplary transmitter 100 of a DSL transceiver embodying the principles of the invention. The transmitter 100 includes multiple FCI blocks 110, 110', 110'', 110''' (generally 110), multiple active applications 120, 120', 120'', 120''' (generally 120), a digital modulator 130, and an Analog Front End (AFE) 140. Those skilled in the art will recognize that although this embodiment describes a transmitter, the inventive concepts contained herein apply equally to a receiver with the same functional blocks in reverse order.

Each of the FCI blocks 110 is in communication with a respective application 120 and is designed to transmit application data 115, 115', 115", 115''' (generally 115), from that respective application 120. An FCI block includes any combination framing, and coding and interleaving for application data. More specifically, each FCI block 110 includes framing, and possibly coding and/or interleaving the application data 115 so that an appropriate combination of BER, latency and impulse noise immunity for the given application is achieved.

The digital modulator 130 is also in communication with the AFE 140, and the AFE 140 is in communication with a communications channel 150. When modulating data, the digital modulator 130 divides the transmitting and receiving frequency spectrum of the communications channel 150 into divisions referred to as subchannels. The digital modulator 130 is also in communication with a Bit Allocation Table (BAT) 145 that specifies the number of bits that are to be modulated onto each of the subchannels of the communications channel 150.

In operation, the transmitter 100 is capable of simultaneously supporting multiple applications 120 with different transmission characteristics and is capable of dynamically switching between modulating data for a first active set of applications and modulating data for a second different active set of applications. An active application set specifies the unique set of one or more currently active applications of different types (e.g. a video application, an Internet access application, and a voice telephony application) for which the transmitter 100 is transmitting data.

Each set of applications has a corresponding parameter set for transmitting (and receiving) signals according to the one or more applications in the application set. Each parameter set includes a variety of parameters that characterize the DMT transmissions of signals associated with the one or more applications over the communications channel. Such parameters include:

the data rate (in bits/second) for transmissions to and from the transmitter 100;

the number of tones (i.e., sub-channels) used in the upstream and downstream transmission paths;

the minimum and maximum quadrature amplitude modulation (QAM) constellation size used on each sub-channel;

the inclusion or exclusion of a trellis code;

the length of the cyclic prefix;

the Reed Solomon (R-S) codeword size;

the interleaver depth, if an interleaver is used;

the number of latency paths, and the data rate of each latency path;

the framing mode (e.g., the ITU ADSL transmission standards G.922.1 specify four different framing modes);

the number of bits allocated to each sub-channel or BAT;

the fine gain adjustments made to each tone, or gain adjustment table (GAT);

the performance margin; and the allocation of subchannels to applications.

The collection of the transmission parameters of the set of currently active applications define the communication state of the transmitter 100 at a particular point in time.

Figure 2:
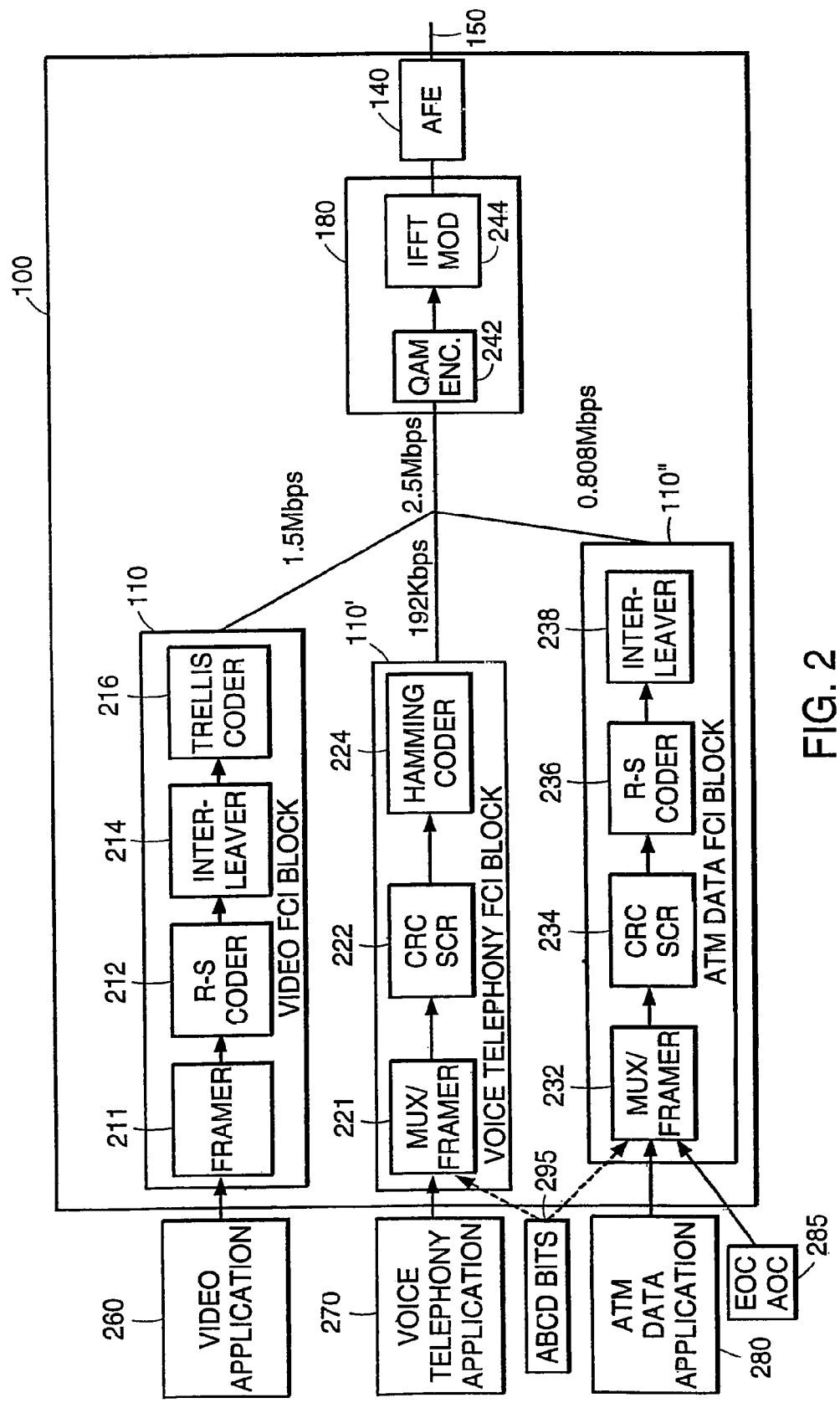
FIG. 2 is a block diagram of an embodiment of the transceiver showing the details of three Framer/Coder/Interleaver blocks designed for three applications and the details of the Digital Modulation block.

FIG. 2 shows an embodiment of transmitter 100 supporting three active applications. The transmitter 100 includes three specialized FCI blocks 110, 110', 110", the ADSL Modulator Block 130, the AFE 140, and the communications channel 150. The three FCI blocks 110, 110', 110" receive input from three respective applications: e.g., a Video Application 260, a Voice Telephony Application 270, and an application transmitting ATM (asynchronous transfer mode) data 280. The output from the specialized FCI blocks 110, 110', 110" is multiplexed together at the ADSL Modulator Block 130. Again, although this embodiment specifies a transmitter, the inventive concepts contained herein could equally be applied to a receiver with the same functional blocks in reverse order.

The FCI block (Video FCI block) 110 is designed to transmit video and includes a Framer block 211, a R-S Coder block 212, a Interleaver block 214, and a Trellis Coder block 216. The FCI block (Voice Telephony FCI block) 110' is designed to transmit voice data and includes a Multiplexer/Framer block 221, a Cyclic Redundancy Check (CRC)/Scrambler (SCR) block 222, and a Hamming Coder block 224. The Multiplexer/Framer block 221 receives data from the Voice Telephony Application 270 and possibly voice telephony signaling bits (ABCD bits) 295. The FCI block (ATM data FCI block) 110" is designed to transmit ATM data and includes a Multiplexer/Framer block 232, a Cyclic Redundancy Check/Scrambler (CRC/SCR) block 234, a R-S Coder block 236, and an Interleaver block 238. The Multiplexer/Framer block 232 multiplexes data from the ATM data Application 280, Embedded Operations Channel/ADSL Overhead Channel (EOC/AOC) data 285, and the possibly the ABCD bits 295.

The ADSL Modulator block 130 includes a Quadrature Amplitude Modulation (QAM) Encoder 242 and an Inverse Fast Fourier Transform (IFFT) Modulator 244.

The components of the specialized FCI blocks 110, 110', 110" depend on the transmission requirements of their respective applications 260, 270, 280. For example, compressed video data requires very low BER (<1E-9) and a high immunity to impulse noise because a single bit error can result in multiple video frame errors when the video stream is decompressed. The R-S Coder block 212 addresses this need by providing large Forward Error Correction (FEC) encoding. The Trellis Coder 216 block is included to provide additional error correction functionality. While data errors are a significant concern for compressed video data transmission, video applications can tolerate a large amount of latency (i.e., greater than approximately 100 ms). This is due to video applications generally not being interactive. The Interleaver block 214, therefore, can be configured for large interleaving codeword depth.

Unlike video data, the transmission of voice telephony data has low latency requirements (i.e., less than approximately 1.5 ms) because it is highly interactive. Accordingly, the Voice Telephony FCI block 110' does not include an interleaver block. Voice telephony transmissions, in contrast to video, can tolerate a high BER (<1E-3) which means that large block FEC codes are unnecessary. Instead the Voice Telephony FCI block 110' is configured with the smaller block Hamming Coder 224. In one alternative embodiment, the Voice Telephony FCI block does not include any coding.

When voice is transmitted over DSL, the Voice Telephony Application 270 transmits the ABCD bits 295 to provide signaling information. As shown in FIG. 2, the ABCD bits can be transmitted either with data from the Voice Telephony Application 270, in-band, or with data from the ATM data Application 280, out-of-band.

ATM data transmission is a typical configuration of ADSL systems that takes raw digital information and formats the data into ATM cells that comprises the data with ATM overhead information. ATM cells can be used to transmit a broad range of data including video and voice telephony data. In this illustrative example, the ATM data Application 280 is an Internet Access Web browsing application. Due to the TCP/IP retransmission protocol, Internet Access Web browsing data transmissions can handle some bit errors, and, therefore, can operate well at a moderate BER of <1E-7. However, the TCP/IP retransmission protocol requires moderate amounts of latency (i.e., less than approximately 20 ms) which means that very large interleavers are not allowed. Based on these requirements, the R-S Coder 236 is configured with medium codeword size, such as 200 bytes. The Interleaver 238 is configured with a medium interleaving depth, such as 5 codewords. These specific configurations are illustrative only, and other specific configurations would also meet the transmission requirements of an Internet Access Web browsing application.

The result of the configuration discussed above is that transmissions from the ATM data FCI block 110" have a high reliability. ABCD bits are transported at a very low data rate (<2 kbps) and carry important information that needs to be well protected. Therefore, it can be advantageous to process the ABCD bits by the ATM data FCI block 110". If, however, it is important to transmit the ABCD bits with the same latency as the Voice Telephony application 270, then it can be advantageous to process the ABCD bits by the Voice Telephony FCI block 110'.

In operation, the transmission data rate of the transmitter 100 varies depending on a number of factors. These factors include: (1) the channel conditions, such as noise, selective fading, multi-path, and impulse noise; (2) the AFE 140 specifications, such as sampling rate, filtering, noise, and hybrid; and (3) the Digital Modulator 130 specifications such as modulation type, constellation size, equalization, and echo cancellation.

In FIG. 2, the transmitter 100 is shown to be transmitting data in one communication state having three active applications 260, 270, 280. According to the principles of the invention, the transmitter 100 is capable of dynamically switching to transmitting data according to a second communication state having, for example, one or two of the applications as active. Specifically, consider that the transmitter 100 has a total data rate of 2.5 Mbps. Initially out of this 2.5 Mbps, 1.5 Mbps is allocated to the Video Application 260. The Voice Telephony Application 270 supports three channels of 64 kbps, and, therefore, has a total of 192 kbps allocated to it. The remaining 0.808 Mbps is allocated to the Internet Access Web Browsing Application 280. When the transmitter 100 dynamically switches to transmitting data according to the second communication state, the allocation of the 2.5 Mbps of data throughput is changed to support such applications that remain active. The process of dynamically changing the allocation of the subchannels is described below in more detail.

Changing the Allocation of Subchannels

In a multicarrier modem, the allocation of subchannels to an application means that the data bits corresponding to that application are modulated on that subchannel. When the set of currently active applications changes, the transmitter 100 dynamically changes the allocation of subchannels to applications to accommodate the currently active applications. Such a dynamic change in the allocation of subchannels can include one or more of the following: (1) a subchannel previously allocated to one application is reallocated to a second different application; (2) a subchannel allocated to one application is allocated to two or more applications, or the reverse in which a subchannel allocated to two or more applications becomes allocated to one application; (3) the number of bits on a subchannel is modified; and/or (4) a previously unused subchannel is allocated to one or more applications, or the reverse in which a previously allocated subchannel becomes unused.

1) Reallocation of Subchannels

Figure 3:
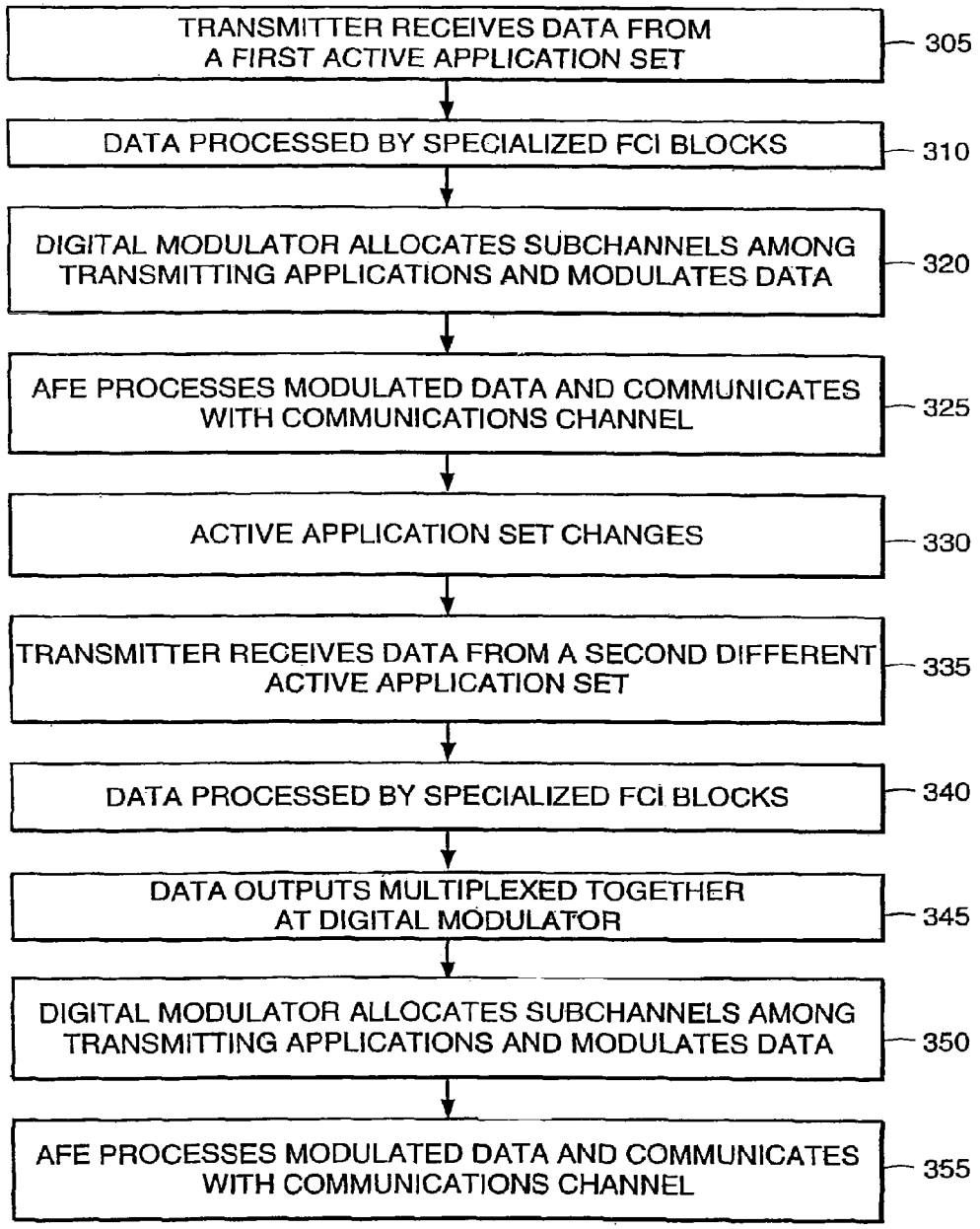
FIG. 3 is a flow diagram of an embodiment of a process by which the transceiver changes the allocation of subchannels from one application to another application.

FIG. 3 shows an exemplary embodiment of a process by which the subchannels are reallocated from one application to another application. For purposes of illustration, the active application set first includes the ATM data Application 280. Subsequently, the active application set changes to include the Voice Telephony Application 270 in addition to the original ATM data Application 280.

The transmitter 100 receives data (step 305) from the ATM data Application 280. The ATM data is processed by the ATM data FCI block 110" (step 310). The Digital Modulator 130 allocates subchannels and modulates the ATM data (step 320). As the ATM data Application 280 is the one active application, the transmitting subchannels are used for ATM data. An exemplary allocation of bits to subchannels is shown in Table 1 below. As indicated by subchannel 13, some of the subchannels may not be used due to variations in subchannel quality. The AFE 140 processes the modulated data and communicates them (step 325) to the communications channel 150.

TABLE 1

Number of Bits Modulated onto each Subchannel (1 Active Application)

| Subchannel Number | Number of Bits (Application) |
|---|---|
| 1 | 4 (ATM) |
| 2 | 3 (ATM) |
| 3 | 2 (ATM) |
| 4 | 8 (ATM) |
| 5 | 1 (ATM) |
| 6 | 2 (ATM) |
| 7 | 4 (ATM) |
| 8 | 6 (ATM) |
| 9 | 5 (ATM) |
| 10 | 7 (ATM) |
| 11 | 4 (ATM) |
| 12 | 2 (ATM) |
| 13 | 0 (None) |
| 14 | 4 (ATM) |
| 15 | 1 (ATM) |
| 16 | 3 (ATM) |

Next, the current active application set changes (step 330). Subsequently, the transmitter enters a new communication state wherein the transmitter begins receiving data (step 335) from the Voice Telephony Application 270 in addition to the original ATM data Application. The voice telephony data and the ATM data are processed (step 340) by the Voice Telephony FCI block 110' and the ATM data FCI 110" block. The data outputs from the FCI blocks 110', 110" are multiplexed (step 345) together at the Digital Modulator 130. The Digital Modulator 130 reallocates the subchannels between the currently transmitting applications 270, 280 and modulates each set of application data (step 350) onto its respective set of subchannels. An exemplary reallocation of bits to subchannels is shown below in Table 2.

TABLE 2

Number of Bits Modulated onto each Subchannel (2 Active Applications)

| Subchannel Number | Number of Bits per DMT Frame (Application) |
|---|---|
| 1 | 4 (ATM) |
| 2 | 3 (ATM) |
| 3 | 2 (ATM) |
| 4 | 8 (Voice) |
| 5 | 1 (ATM) |

TABLE 2-continued

Number of Bits Modulated onto each Subchannel
(2 Active Applications)

| Subchannel Number | Number of Bits per DMT Frame (Application) |
|---|---|
| 6 | 2 (ATM) |
| 7 | 4 (ATM) |
| 8 | 6 (Voice) |
| 9 | 5 (ATM) |
| 10 | 7 (ATM) |
| 11 | 4 (2-ATM/2-Voice) |
| 12 | 2 (ATM) |
| 13 | 0 (None) |
| 14 | 4 (ATM) |
| 15 | 1 (ATM) |
| 16 | 3 (ATM) |

As can be seen by a comparison of Tables 1 and 2, the reallocation of subchannels includes allocating to the newly activated Voice Telephony Application 270 subchannels that were previously used for transmissions from the ATM data Application 280. In particular subchannels #4 and #8 are dynamically allocated to the voice channel when the phone goes off hook. Discussed below in more detail, subchannel #11 is allocated to both the ATM data Application 280 and the Voice Telephony Application 270.

The technique of reallocating subchannels for a single phone channel can be expanded to support multiple phone channels. Every time a new voice channel is activated an additional 64 kbps is allocated to the voice channel path in order to complete the phone call.

Various algorithms can be used to select the subchannels allocated to an application in the active application set. For example, one technique for selecting the subchannels allocated to the Voice Telephony Application 270 is to iterate through the subchannels and select the first two subchannels having 8 bits assigned. This iteration of subchannels can use an ordering of the subchannels based on various factors including the frequency or constellation size of the subchannels. Another technique is to iterate through the subchannels and allocate the first 16 bits to the voice telephony application. Unless exactly 16 bits are provided by the set of subchannels allocated to the Voice Telephony Application 270, a subchannel will have some of its bits allocated to the Voice Telephony Application 270 and some of its bits allocated to another application. The sharing of subchannels is discussed below in more detail. Again, the iteration of subchannels can use an ordering of the subchannels based on various factors including the frequency or constellation size of the subchannels. After the Digital Modulator 130 reallocates the subchannels and modulates the data, the AFE 140 process the modulated signals and communicates (step 355) them to the communications channel 150.

The process described above specifies the transition from the ATM data Application 280 to the combination of the ATM data Application 280 with the Voice Telephony Application 270. This represents the situation where a phone is taken off hook. The reverse process of transitioning from the ATM data Application 280 and the Voice Telephony Application 270 to the ATM data Application 280 is described by the reverse of the steps specified above. In general this includes transmitting according to Table 2 and then switching to transmitting according to Table 1. This represents the situation where the phone is placed back on hook. Although this embodiment specifies a transmitter, the inventive concepts contained herein apply equally to a receiver with the same functional blocks in reverse order.

2) Sharing of Subchannels

As part of the allocation of subchannels to applications, it is possible for a subchannel to carry data for two different applications. This means that when the active application set changes and the allocation of subchannels is modified, a subchannel allocated to a single application can become allocated to two or more applications. Conversely, a subchannel allocated to two or more applications can become allocated to one application.

TABLE 3

Number of Bits Modulated onto each Subchannel (2 Active Applications)

| Subchannel Number | Number of Bits per DMT Frame (Application) |
|---|---|
| 1 | 4 (Voice) |
| 2 | 3 (Voice) |
| 3 | 2 (Voice) |
| 4 | 8 (7-Voice/1-ATM) |
| 5 | 1 (ATM) |
| 6 | 2 (ATM) |
| 7 | 4 (ATM) |
| 8 | 6 (ATM) |
| 9 | 5 (ATM) |
| 10 | 7 (ATM) |
| 11 | 4 (ATM) |
| 12 | 2 (ATM) |
| 13 | 0 (None) |
| 14 | 4 (ATM) |
| 15 | 1 (ATM) |
| 16 | 3 (ATM) |

The former modification in the allocation of subchannels is shown with respect to Tables 1 and 3. In Table 1 subchannel #4 carries eight bits of data for the ATM data Application 280. Table 3 shows that as part of the change in the allocation of subchannels due to the activation of the Voice Telephony Application 270, one bit of subchannel #4 now carries data for the original ATM data Application 280 and seven bits now carry data for the Voice Telephony Application 270. The subchannels allocated to the Voice Telephony Application shown in Table 3 were selected by iterating through the subchannels using an ordering of the subchannels based on starting from the lowest frequency subchannel and ascending in frequency. The ordering of the subchannels could also have been done based on starting from the highest frequency subchannel and descending in frequency. In this event, subchannels #16, #15, #14, #12, #11, and 2 bits of subchannel #10 would be allocated to the voice telephony application (assuming subchannel #13 remains unused). The other bits of subchannel #10 are still allocated to the ATM data Application 280. Another ordering of the subchannels could have been based on starting from subchannel with the least number of bits and ascending through the subchannels based on the number of bits per subchannel. In this event, subchannels #5, #15, #3, #6, #12, #2, #16, and 2 bits of subchannel #1 would be allocated to the voice telephony application (again assuming subchannel #13 remains unused). The other bits of subchannel #1 are still allocated to the ATM data Application 280. A further alternative ordering of the subchannels could have been based on starting from subchannel with the highest number of bits and descending through the subchannels based on the number of bits per subchannel. In this event, subchannels #4, #10, and 1 bit of subchannel #8 would be allocated to the voice telephony. The other bits of subchannel #8 are still allocated to the ATM data Application 280.

3) Modification of the Number of Bits Carried by a Subchannel

In one embodiment, as part of dynamically changing the allocation of subchannels, the BAT 145 is modified in accordance with the set of applications that are presently being transmitted over the communications channel 150. In particular, a reallocated subchannel of the BAT 145 may be modified to carry a different number of bits depending on the transmission characteristics of the application whose data is presently being transported by that subchannel. For example, a particular subchannel might be allocated 4 bits per DMT frame when transmitting ATM data and the same subchannel might be allocated 6 bits per DMT frame when transmitting voice telephony data.

The modification is based on the different BER and margin requirements of the respective applications. The margin is defined as the amount of increased noise power (in dB) relative to the noise power that the system is designed to tolerate and still meet the target BER. For example typically ADSL systems are designed and deployed with a 6 dB margin relative to a 1E-7 BER. This means that if the received noise power increases by 6 dB, then the modem would still achieve the 1E-7 BER requirement. The margin is used to provide additional immunity to noise, both crosstalk and impulse noise. Different applications may require different margins as each may have a different tolerance for bit errors.

Table 4 shown below is an example of where the allocation of bits to subchannels, i.e. the BAT, is determined by the margin and BER requirements of the application data being transmitted. Columns 1 and 2 respectively indicate the subchannels and their measured Signal-to-Noise (SNR). Columns 3 through 6 specify different BATs given the subchannel quality and application transmission requirements. Column 3 is constructed with an equal 6 dB margin and 1E-7 BER across all subchannels and would be appropriate for the transmission of ATM data. As the bottom of the column 3 indicates, the specified SNR of the subchannels allows for a total of 52 bits per DMT frame given the BER and margin requirements. Column 4 is constructed for a voice only transmission with an equal 4 dB margin and 1E-3 BER across all subchannels. As the bottom of the column 4 indicates, the specified SNR of the subchannels allows for a total of 84 bits per DMT frame given the BER and margin requirements.

Columns 5 and 6 show how subchannels are reallocated in accordance with the invention. Column 5 is a BAT where 1 voice telephony and an Internet access to application are running over the ADSL communication channel 150. The subchannels allocated to ATM data are designated with a (d) and those allocated to voice telephony are designated with a (v).

TABLE 4

Modified BATs Supporting Dynamic Switching

| Subchannel # | Measured SNR per subchannel | Number of bits with 1E-7 and 6 dB margin (data only) | Number of bits with 1E-3 and 4 dB Margin (voice only) | Example of BAT with 1 voice channels active and Internet data | Example of BAT with 2 voice channels active and Internet data |
|---|---|---|---|---|---|
| 1 | 18 | 1 | 3 | 1 (d) | 1 (d) |
| 2 | 18 | 1 | 3 | 1 (d) | 1 (d) |
| 3 | 28 | 4 | 6 | 4 (d) | 6 (v) |
| 4 | 40 | 8 | 10 | 8 (d) | 10 (v) |
| 5 | 25 | 3 | 6 | 3 (d) | 3 (d) |
| 6 | 25 | 3 | 5 | 3 (d) | 3 (d) |
| 7 | 31 | 5 | 7 | 5 (d) | 5 (d) |
| 8 | 34 | 6 | 8 | 6 (d) | 6 (d) |
| 9 | 21 | 2 | 4 | 4 (v) | 4 (v) |
| 10 | 25 | 3 | 5 | 3 (d) | 3 (d) |
| 11 | 21 | 2 | 4 | 2 (d) | 2 (d) |
| 12 | 34 | 6 | 8 | 8 (v) | 8 (v) |
| 13 | 15 | 0 | 2 | 2 (v) | 2 (v) |
| 14 | 15 | 0 | 2 | 2 (v) | 2 (v) |
| 15 | 25 | 3 | 5 | 3 (d) | 3 (d) |
| 16 | 31 | 5 | 7 | 5 (d) | 5 (d) |
| | | (Total # of bits per DMT frame) = 52 (208 kbps) | (Total # of bits per DMT frame) = 84 (336 kbps) | (Total # of bits per frame) = 60 (240 kbps) 64 kbps voice 176 kbps data | (Total # of bits per frame) = 64 (256 kbps) 128 kbps voice 128 kbps data |

One example that illustrates the operation of the invention is where an Internet access application is running alone and then a voice telephony application is activated. In this situation, the transceiver is able to add the voice telephony throughput without losing the same amount of Internet access throughput. A comparison of the throughput of columns 3, 4, and 5 demonstrates this aspect of the invention. First, it reveals that the throughput of column 5 is less than column 4 (voice only) but more than column 3 (Internet access only). Further, it reveals that the Internet access data rate decreases only 32 kbps when the 64 kbps voice channel is activated. This is partially due to two factors. First, the subchannels #13 and #14 had a SNR of 14 dB which made them unusable for the Internet application but acceptable for the voice telephony application. Second, the lower margin and higher BER tolerances for the voice telephony application means that when the subchannels #9 and #12 are switched from Internet access to voice telephony the number of bits carried by the subchannel can be increased. In particular, subchannel 9 switched from 2 to 4 bits and subchannel #12 switched from 6 to 8 bits.

Column 6 shows how the BAT is modified when 2 voice channels are active. In this case the Internet access data rate decreases only 48 kbps when two phones (64×2=128 kbps)

are activated. When three or more voice channels are activated, the BAT is modified in a similar manner.

Columns 3 through 6 indicate different active application sets and transitions between any of these communication states are possible as applications are activated and deactivated. In one embodiment, the method for changing the number of bits carried on a particular subchannel is to dynamically modify a single BAT. In another embodiment, the method includes switching between BATs that represent the different possible communication states of the transceiver.

4) Utilization and Non-Utilization of Subchannels Due to Subchannel Quality

Different applications typically have different requirements for subchannel quality. This means that when an application requiring lower subchannel quality becomes active, a previously unused subchannel can become active. It also means that when an application requiring lower subchannel quality becomes inactive, a subchannel allocated to that application may become unused if only applications requiring higher subchannel quality remain active.

Table 5 shows an embodiment in which only previously unused subchannels are utilized for the voice channel. This is can occur when there are several subchannels that have a SNR that is adequate to support voice, e.g. data at 1E-3 BER and 4 dB margin, but not Internet access data, e.g. data at 1E-7 BER and 6 dB margin. In this illustrative example, subchannels #1-8 are capable of supporting 2 bits for the voice application but 0 bits for the Internet access data application. Column 5 shows the BAT when 1 voice channel and an Internet access application are supported. Because the voice channel uses subchannels that were unused in the data only mode (column 3) there is no decrease in the Internet access data rate when 1 voice channel is active.

This embodiment provides significant advantage in operation in that the Internet access data path is not affected when telephones are activated or de-activated. As more voice channels are activated, it may be necessary to reallocate some of the Internet access subchannels to voice telephony and therefore decrease the Internet access application data rate. This is shown in the illustrative example in Table 4. Another advantage of this embodiment of the invention is that the voice channel can be always connected, even when the telephone is on-hook, because there is no decrease in the data rate of the Internet access application. This simplifies the protocols for handling activation and de-activation of telephone calls because the BAT is not modified dynamically and the voice channel bandwidth is always allocated.

The BATs indicated by columns 3, 4 and 5 indicate different active application sets and transitions between any of these communication states are possible as applications are activated and deactivated. Methods for achieving these transitions were discussed above.

While the invention has been shown and described with reference to specific preferred embodiments, it should be understood by those skilled in the art that various changes in form and detail may be made therein without departing from the spirit and scope of the invention as defined by the following claims. For example, although the invention is described with respect to DMT modulation, the principles of the invention apply to DWMT (Discrete Wavelet Multitone) modulation. Also, IP frames instead of ATM packets can be used to transport data. The principles of the invention also apply to any DMT communication system that supports multiple sets of applications, where the applications are activated and de-activated over time. Further, although the specification uses ADSL to describe the invention, it is to be understood that any

TABLE 5

BATs Demonstrating Utilization of Previously Unused Subchannels

| Subchannel # | Measured SNR per subchannel | Number of bits with 1E-7 and 6 dB margin (data only) | Number of bits with 1E-3 and 4 dB Margin (voice only) | Example of BAT with 1 voice channels active and Internet data |
|---|---|---|---|---|
| 1 | 15 | 0 | 2 | 2 (v) |
| 2 | 15 | 0 | 2 | 2 (v) |
| 3 | 15 | 0 | 2 | 2 (v) |
| 4 | 15 | 0 | 2 | 2 (v) |
| 5 | 15 | 0 | 2 | 2 (v) |
| 6 | 15 | 0 | 2 | 2 (v) |
| 7 | 15 | 0 | 2 | 2 (v) |
| 8 | 15 | 0 | 2 | 2 (v) |
| 9 | 31 | 5 | 7 | 5 (d) |
| 10 | 31 | 5 | 7 | 5 (d) |
| 11 | 34 | 6 | 8 | 6 (d) |
| 12 | 34 | 6 | 8 | 6 (d) |
| 13 | 37 | 7 | 9 | 7 (d) |
| 14 | 37 | 7 | 9 | 7 (d) |
| 15 | 40 | 8 | 10 | 8 (d) |
| 16 | 40 | 6 | 6 | 6 (d) |
| | | (Total # of bits per DMT frame) = 50 (200 kbps) | (Total # of bits per DMT frame) = 82 (328 kbps) | (Total # of bits per frame) = 66 (264 kbps) 64 kbps voice 200 kbps data | form of DSL can be used, i.e., VDSL, SDSL, HDSL, HDSL2, or SHDSL. Although several embodiments described above included Internet and voice applications, it is also to be understood that the principles of the invention apply to any combination of applications transported over DSL systems (e.g., telecommuting, video conferencing, high speed Internet access, video-on demand).

The invention claimed is:

1. An apparatus comprising:
   a plurality of framer/coder/interleaver (FCI) blocks configured to process data associated with a plurality of applications; and
   a digital modulator coupled to the plurality of FCI blocks and configured to allocate a previously unallocated subchannel of a multicarrier modulation communication channel to one of the plurality of applications in response to a change in a set of active applications, wherein the set of active applications comprises one or more of the plurality of applications.

2. The apparatus of claim 1, wherein the digital modulator is further configured to reallocate a previously allocated subchannel to another application of the plurality of applications in response to the change.

3. The apparatus of claim 2, wherein the digital modulator is further configured to alter a number of bits carried by the previously allocated subchannel.

4. The apparatus of claim 1, wherein the digital modulator is further configured to allocate one subchannel of the multicarrier modulation system to two applications in the set of active applications.

5. The apparatus of claim 1, wherein the plurality of applications includes one or more of a voice telephony application, an asynchronous transfer mode application, an internet protocol application, and a video application.

6. The apparatus of claim 1, wherein the change in the set of active applications includes a reduction in a number of the active applications.

7. The apparatus of claim 1, wherein the change in a set of active applications includes an increase in a number of the active applications.

8. The apparatus of claim 1, wherein the digital modulator is further configured to un-allocate a previously allocated subchannel in response to the change in the set of active applications.

9. The apparatus of claim 1, further comprising an analog front end coupled to the digital modulator and configured to modulate data signals comprising bits from the set of active applications.

10. The apparatus of claim 1, further comprising an analog front end coupled to the digital modulator and configured to demodulate data signals comprising bits from the set of active applications.

11. The apparatus of claim 1, wherein the plurality of FCI blocks are further configured to process bits associated with the plurality of applications over a plurality of latency paths.

12. The apparatus of claim 1, wherein the plurality of FCI blocks include one or more application-specific FCI blocks.

13. An apparatus comprising:
    a plurality of framer/coder/interleaver (FCI) blocks configured to process data associated with a plurality of applications and to transition from one latency path set to a second latency path set in response to a change in a set of active applications from a first application set to a second application set; and
    a digital modulator coupled to the plurality of FCI blocks and configured to change an allocation of subchannels of a multicarrier modulation communication channel in response to the change.

14. The apparatus of claim 13, wherein the digital modulator is further configured to reallocate a previously allocated subchannel to one or more applications in the second application set in response to the change.

15. The apparatus of claim 14, wherein the digital modulator is further configured to alter a number of bits carried by the previously allocated subchannel.

16. The apparatus of claim 13, wherein the digital modulator is further configured to allocate a previously unallocated subchannel to one or more applications in the second application set in response to the change.

17. The apparatus of claim 13, wherein the plurality of applications includes one or more of a voice telephony application, an asynchronous transfer mode application, an internet protocol application, and a video application.

18. The apparatus of claim 13, wherein the change in the set of active applications includes a reduction in a number of the set of active applications.

19. The apparatus of claim 13, wherein a first number of applications in the first application set is lower than a second number of applications in the second application set.

20. The apparatus of claim 13, further comprising an analog front end coupled to the digital modulator and configured to modulate data signals comprising bits from the set of active applications.

21. The apparatus of claim 13, further comprising an analog front end coupled to the digital modulator and configured to demodulate data signals comprising bits from the set of active applications.

* * * * *

UNITED STATES PATENT AND TRADEMARK OFFICE
CERTIFICATE OF CORRECTION

PATENT NO. : 8,045,603 B2
APPLICATION NO. : 12/859086
DATED : October 25, 2011
INVENTOR(S) : Tzannes et al.

It is certified that error appears in the above-identified patent and that said Letters Patent is hereby corrected as shown below:

Title page, item (57), under "Abstract", in Column 2, Line 19, delete "embodiment" and insert -- embodiment, --.

Title Page 3, item (56), under "Other Publications", in Column 2, Line 30, delete "Procesing," and insert -- Processing, --.

Title Page 3, item (56), under "Other Publications", in Column 2, Line 38, delete "Globaliztion," and insert -- Globalization, --.

Signed and Sealed this
First Day of May, 2012

David J. Kappos
*Director of the United States Patent and Trademark Office*